US011513899B2

(12) United States Patent
Caughman et al.

(10) Patent No.: US 11,513,899 B2
(45) Date of Patent: Nov. 29, 2022

(54) SELECTIVELY CAPTURING SNAPSHOTS OF VOLUMES BASED ON MODIFIED CAPACITY

(71) Applicant: International Business Machines Corporation, Armonk, NY (US)

(72) Inventors: Matthew Hulsey Caughman, Harris, TX (US); Yves Alexandre Beraldo dos Santos, Houston, TX (US); Carlos F. Fuente, Bishops Waltham (GB)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/107,587

(22) Filed: Nov. 30, 2020

(65) Prior Publication Data

US 2022/0171679 A1 Jun. 2, 2022

(51) Int. Cl.
*G06F 12/00* (2006.01)
*G06F 11/14* (2006.01)
*G06F 3/06* (2006.01)

(52) U.S. Cl.
CPC ........ *G06F 11/1451* (2013.01); *G06F 3/0604* (2013.01); *G06F 3/065* (2013.01); *G06F 3/067* (2013.01); *G06F 3/0619* (2013.01); *G06F 3/0653* (2013.01); *G06F 3/0665* (2013.01); *G06F 2201/84* (2013.01)

(58) Field of Classification Search
CPC .. G06F 11/1451; G06F 3/0604; G06F 3/0619; G06F 3/065; G06F 3/0653; G06F 3/0665; G06F 3/067; G06F 2201/84
See application file for complete search history.

(56) References Cited

U.S. PATENT DOCUMENTS

| 7,734,578 | B2 | 6/2010 | Prahlad et al. |
| 8,046,547 | B1 | 10/2011 | Chatterjee et al. |
| 8,856,202 | B2 | 10/2014 | McCabe et al. |
| 9,635,132 | B1 | 4/2017 | Lin et al. |

(Continued)

FOREIGN PATENT DOCUMENTS

WO 2018231806 A1 12/2018

OTHER PUBLICATIONS

Hewlett Packard, "HPE 3PAR Virtual Copy, Snapshots and copy data management" Hewlette Packard Enterprise, Techinical White Paper, Rev. 4, Jun. 2019, 37 pages.

(Continued)

*Primary Examiner* — Jason W Blust
(74) *Attorney, Agent, or Firm* — Zilka-Kotab, P.C.

(57) ABSTRACT

A computer-implemented method, according to one embodiment, includes: monitoring data requests that are performed on a logical volume in memory at a source location, and tracking changes that are made to data in the logical volume as a result of performing the data requests. A determination is made as to whether a preestablished amount of the data in the logical volume has been changed as a result of performing the data requests since a previous snapshot of the logical volume was captured. Moreover, in response to determining that a preestablished amount of the data in the logical volume has been changed as a result of performing the data requests since a previous snapshot of the logical volume was captured, a new snapshot of the logical volume is captured.

19 Claims, 6 Drawing Sheets

(56) References Cited

U.S. PATENT DOCUMENTS

| | | | |
|---|---|---|---|
| 9,754,005 | B2 | 9/2017 | Potter et al. |
| 10,311,151 | B2 | 6/2019 | Tabaaloute et al. |
| 10,387,264 | B1* | 8/2019 | Telichari ............. G06F 11/1435 |
| 10,791,025 | B2 | 9/2020 | Kumarasamy et al. |
| 2007/0276885 | A1* | 11/2007 | Valiyaparambil ... G06F 11/1451 |
| 2012/0130949 | A1 | 5/2012 | Picken et al. |
| 2015/0142748 | A1 | 5/2015 | Gottemukkula et al. |
| 2017/0091047 | A1* | 3/2017 | Bangalore ........... G06F 11/1451 |
| 2019/0278661 | A1* | 9/2019 | Mehta .................... G06F 3/061 |

OTHER PUBLICATIONS

U.S. Appl. No. 13/076,792, filed Mar. 31, 2011.
U.S. Appl. No. 10/989,893, filed Nov. 15, 2004.
U.S. Appl. No. 12/982,087, filed Dec. 30, 2010.
Wikipedia, "Snapshot (computer storage)," Wikipedia, 2020, 3 pages, retrieved from https://en.wikipedia.org/wiki/Snapshot_(computer_storage).

* cited by examiner

SELECTIVELY CAPTURING SNAPSHOTS OF VOLUMES BASED ON MODIFIED CAPACITY

BACKGROUND

The present invention relates to data storage systems, and more specifically, this invention relates to the management and transfer of data between storage locations in a data storage system.

A clustered filesystem is a filesystem which is shared by being simultaneously mounted on multiple servers. Moreover, active file management (AFM) is a scalable, file system caching layer which is implemented in some clustered file systems. AFM allows users to create associations between a local cluster and a remote cluster, as well as define the location and flow of file data therebetween to automate the management of the data. It follows that clustered filesystems are somewhat insulated from experiencing data loss following disaster situations in which one of the multiple servers fail, and are therefore often utilized for data retention purposes.

For example, snapshot-based asynchronous disaster recovery architectures include a primary site and a secondary site. An initial snapshot taken at the primary site is passed to the secondary site, after which incremental snapshots of the primary site are transferred to the secondary site. The primary site often functions as a read-writeable fileset which is able to host applications that are given read/write access to the data stored therein. It follows that the data stored in the primary site is asynchronously replicated to the secondary site. Moreover, a recovery point objective (RPO) setting allows for the frequency at which the incremental snapshots are taken to be specified.

SUMMARY

A computer-implemented method, according to one embodiment, includes: monitoring data requests that are performed on a logical volume in memory at a source location, and tracking changes that are made to data in the logical volume as a result of performing the data requests. A determination is made as to whether a preestablished amount of the data in the logical volume has been changed as a result of performing the data requests since a previous snapshot of the logical volume was captured. Moreover, in response to determining that a preestablished amount of the data in the logical volume has been changed as a result of performing the data requests since a previous snapshot of the logical volume was captured, a new snapshot of the logical volume is captured.

A computer program product, according to another embodiment, includes one or more computer readable storage media having program instructions embodied therewith. Moreover, the program instructions readable and/or executable by a processor to cause the processor to: perform the foregoing method.

A system, according to yet another embodiment, includes: a processor, and logic that is integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
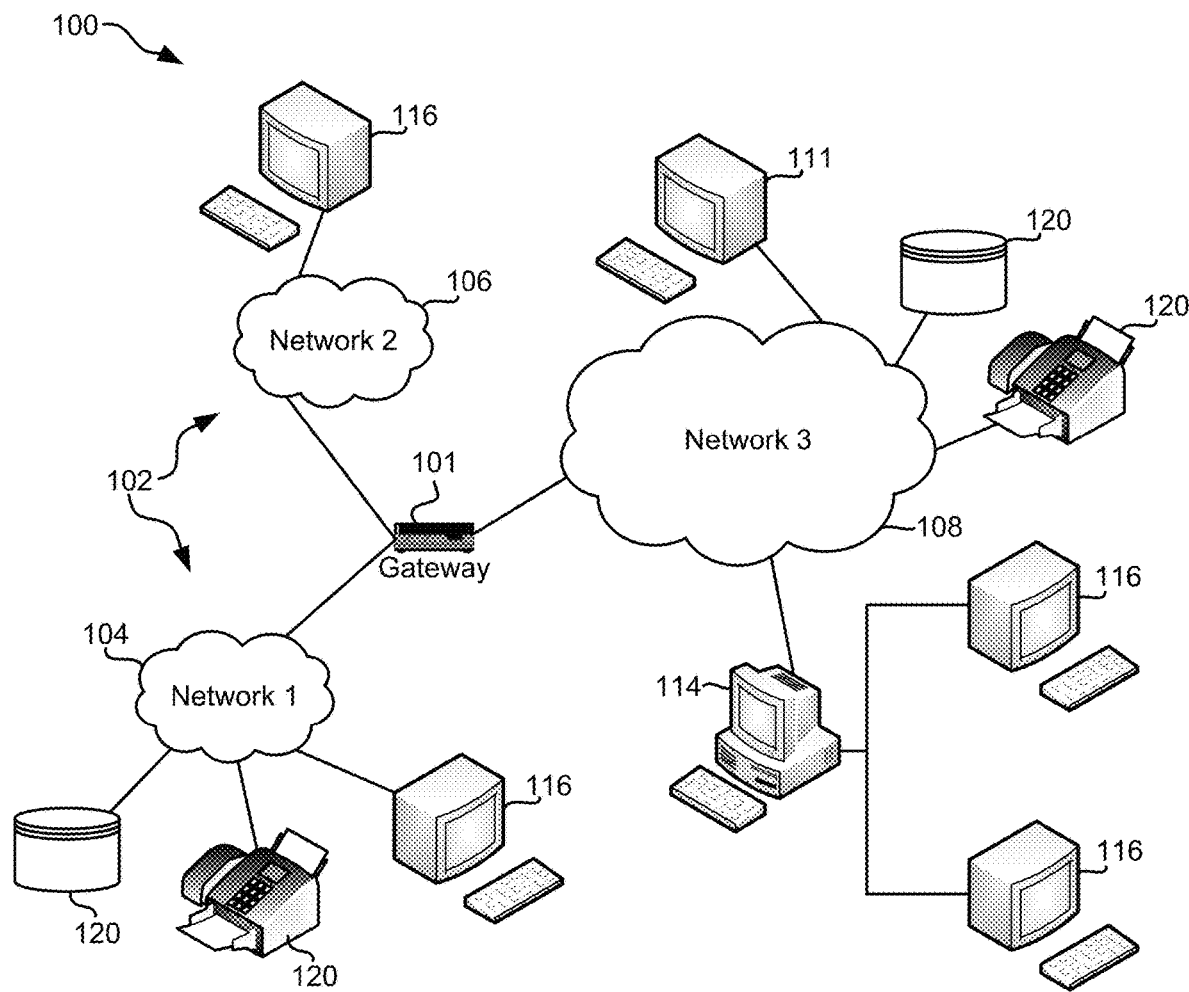
FIG. 1 is a diagram of a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which are able to significantly improve the efficiency at which storage environments implementing snapshot based data replication are able to operate. Some of the embodiments included herein are able to achieve this improved performance by actively avoiding the creation of redundant snapshots, thereby reducing system processing overhead and decreasing network latency while maintaining high data retention, e.g., as will be described in further detail below.

In one general embodiment, a computer-implemented method includes: monitoring data requests that are performed on a logical volume in memory at a source location, and tracking changes that are made to data in the logical volume as a result of performing the data requests. A determination is made as to whether a preestablished amount of the data in the logical volume has been changed as a result of performing the data requests since a previous snapshot of the logical volume was captured. Moreover, in response to determining that a preestablished amount of the data in the logical volume has been changed as a result of performing the data requests since a previous snapshot of the logical volume was captured, a new snapshot of the logical volume is captured.

In another general embodiment, a computer program product includes one or more computer readable storage media having program instructions embodied therewith. Moreover, the program instructions readable and/or executable by a processor to cause the processor to: perform the foregoing method.

In yet another general embodiment, a system includes: a processor, and logic that is integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
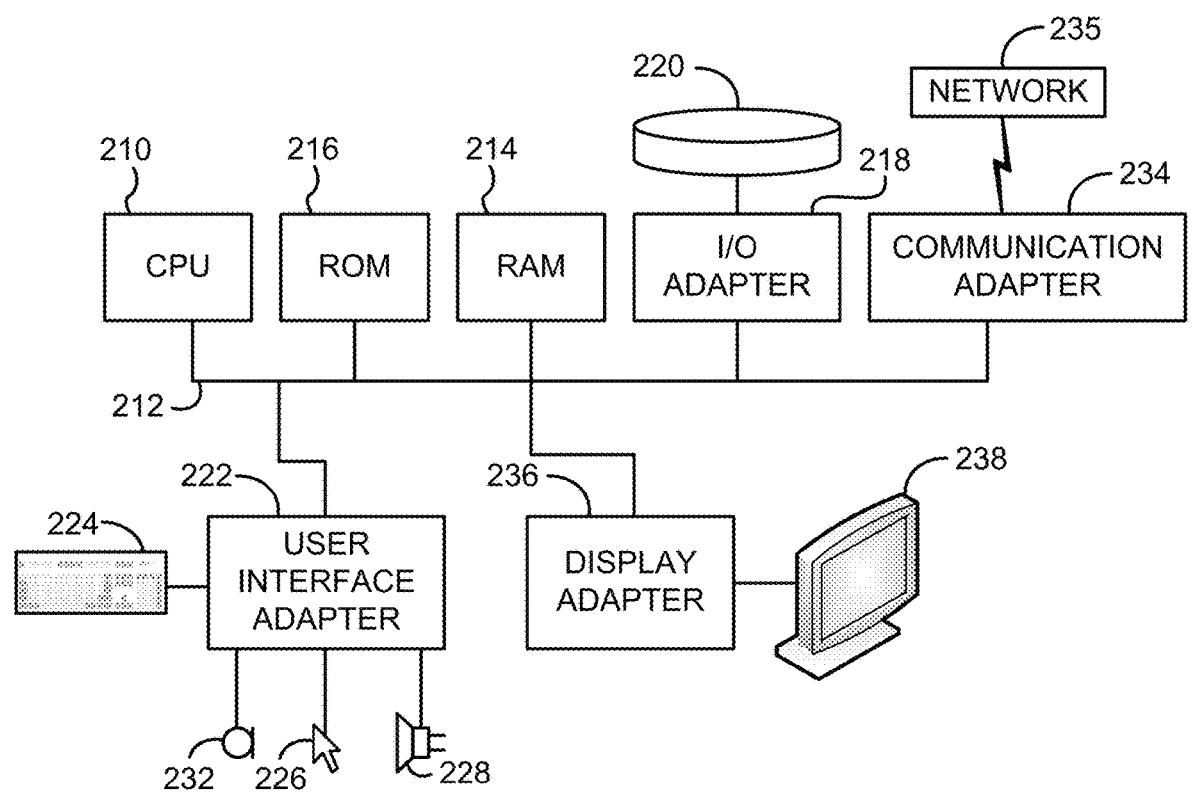
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
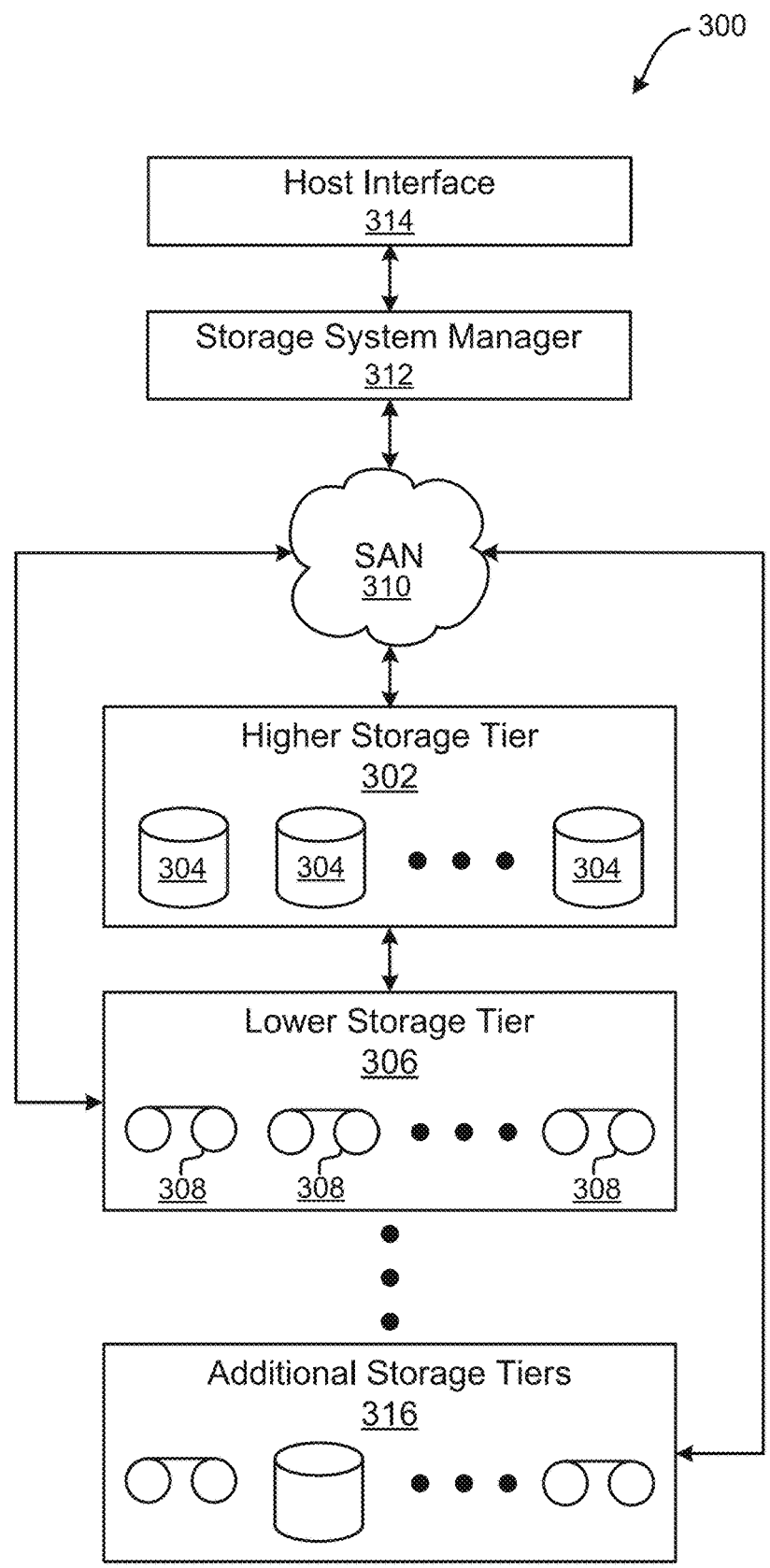
FIG. 3 is a diagram of a tiered data storage system, in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Successfully performing a full backup of a large data set typically takes a substantial amount of time to complete. However, on multi-tasking or multi-user systems, data operations may continue to be received and/or performed on data while it is being backed up. This prevents backup operations from being atomic and introduces a version skew that may result in data corruption. For example, if a user moves a file into a directory that has already been backed up, then that file would not be present on the backup media, as the backup operation had already taken place before the addition of the file. Version skew may also cause corruption with files which undesirably change their size or contents underfoot while being read.

An alternative option to safely back up live data is to temporarily disable write access to data during the backup procedure, either by stopping any accessing applications, or by using a locking application programming interface (API) provided by the operating system to enforce exclusive read access. While this option is tolerable for low-availability systems, e.g., such as desktop computers and small workgroup servers on which regular downtime is acceptable, high availability systems cannot tolerate service stoppages.

To avoid downtime, high availability systems may instead perform the backup using a snapshot which represents a read-only copy of the data set as it existed at a given point in time, while allowing applications to continue writing to the data. For instance, as mentioned above, snapshot-based asynchronous disaster recovery architectures are utilized in order to avoid data loss in disaster situations. This has been implemented by taking an initial snapshot at a primary site, which is then passed to a removed secondary site. After the initial snapshot, incremental snapshots of the primary site are transferred to the secondary site. The primary site often functions as a read-writeable fileset which is able to host applications that are given read/write access to the data stored therein. It follows that the data stored at the primary site is asynchronously replicated to the secondary site. For instance, file user data, metadata, hard links, renames, clones, etc. at the primary site are replicated to the secondary site. However, file system and fileset related attributes, e.g., such as user, group and/or fileset quotas, replication factors, dependent filesets, etc., from the primary site are often not replicated to the secondary site.

Snapshots are typically triggered based on a timing schedule, e.g., such as once every week. More sophisticated snapshot scheduling is also capable of removing snapshots based on the number of copies that exist. While these snapshot schemes are sufficient for volumes that are likely to be changed at a predictable rate within the timeframe, they often cause inefficiencies for the system as a whole because no consideration is given as to how much of the volumes have actually changed between the snapshots being taken. For instance, external software platforms have been used to schedule and coordinate the creation and deletion of snapshots in specific time intervals. However, these software platforms have been unable to understand how much of a volume has changed between when the latest snapshots were taken. It follows that previous implementations often experience situations where multiple different snapshots are created which contain identical data, thereby decreasing storage space, squandering internal resources of the storage system, e.g., such as bandwidth, etc.

Other implementations have relied on the occurrence of data events for stored information to determine when to produce a snapshot. However, these implementations are also prone to generating redundant snapshots with duplicate information if the data events occur without any changes being made to the data. Previous implementations have also been subject to reaching global snapshot limits in view of how frequent the snapshots are taken. Once a global snapshot limit has been reached, the system is prevented from being able to create any additional snapshots thereby jeopardizing data retention. Snapshot limits have been increased in an effort to avoid this issue, but any increases to these snapshot limits cause significant performance problems due to the number of times quiesce operations are consequently performed on the stored information.

In sharp contrast to the foregoing shortcomings experienced by previous implementations, various ones of the embodiments included herein are able to utilize the amount of data that has actually been modified in a given volume to determine if a snapshot should be captured. For instance, some of the approaches herein determine whether a threshold amount of the data in the volume has been updated before triggering a snapshot capture, e.g., as will be described in further detail below.

Figure 4:
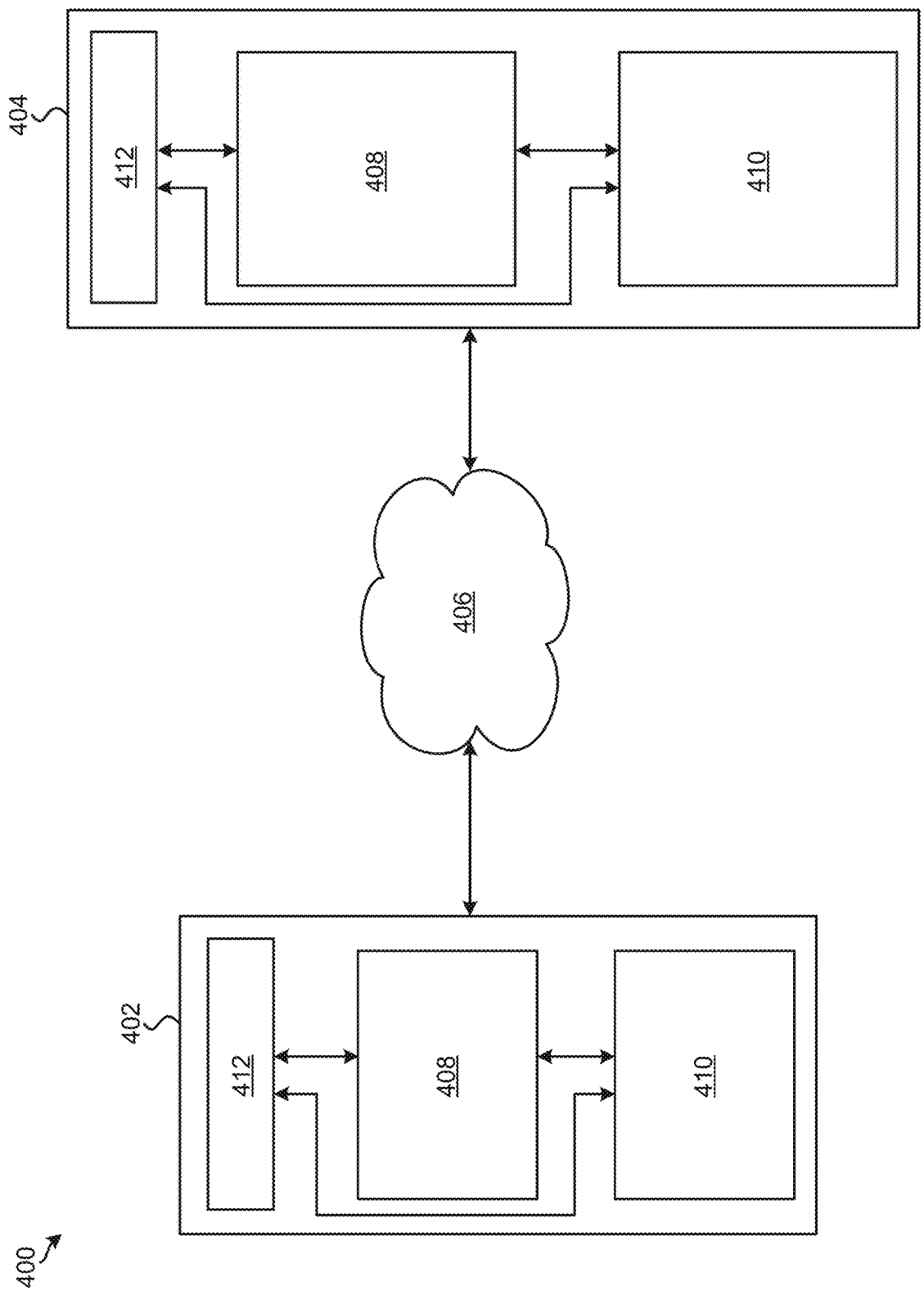
FIG. 4 is a partial representative view of a distributed data storage system in accordance with one embodiment.

Looking now to FIG. 4, a distributed data storage system 400 is illustrated in accordance with one embodiment. As an option, the present data storage system 400 may be implemented in conjunction with features from any other embodiment listed herein, such as those described with reference to the other FIGS. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

As shown, the data storage system 400 includes a source location 402 (e.g., a first storage location) and a target location 404 (e.g., a second storage location) which are connected by a network 406. In some approaches, the source location 402 and the target location 404 each include data storage components (e.g., types of memory) which are capable of achieving different data performance levels. In other words, the source and target storage locations 402, 404 may each include a multi-tier data storage system which includes a lower performance storage tier 410 and a higher performance storage tier 408. With respect to the present description, the lower performance storage tier 410 has a lower level of performance (e.g., a lower achievable throughput, slower data access rates, higher write delays, etc.) at least with respect to that of the higher performance storage tier 408. According to an example, which is in no way intended to limit the invention, the higher performance storage tier 408 includes SSDs while the lower performance storage tier 410 includes HDDs.

Moreover, a controller (e.g., processor) 412 is included in each of the source and target storage locations 402, 404, each of the controllers 412 being electrically coupled to the respective higher and lower performance storage tiers 408, 410. The controllers 412 at the source and target storage locations 402, 404 may also be able to communicate with each other (e.g., send data, commands, requests, etc. to each other) using a connection to network 406.

The network 406 connecting the source and target storage locations 402, 404 may be a WAN according to some approaches. However, the network 406 may include any desired type of network, e.g., such as a LAN, a SAN, a personal area network (PAN), etc., e.g., depending on the approach. For instance, the type of network 406 used to connect the source and target storage locations 402, 404 may depend on the distance separating the storage locations. According to some approaches, the source and target storage locations 402, 404 may be geographically separated by any amount of physical distance.

As described above, snapshot-based asynchronous disaster recovery architectures implement a source location (also referred to herein as a "primary storage location") and a target location (also referred to herein as a "secondary storage location"), the two sites being able to transfer data therebetween. For instance, snapshots are incrementally taken at the source location and then passed (e.g., asynchronously replicated) to the removed target location for redundant storage. A storage snapshot is a set of reference markers for data at a particular point in time in some approaches. In other words, a snapshot serves as a detailed table of contents, providing accessible copies of data which may be accessed as desired.

Accordingly, the source location 402 functions as a "primary storage location", while the target location 404 serves as a "secondary storage location" in preferred approaches. However, this is in no way intended to be limiting. For example, in other approaches the source location 402 may function as the "secondary storage location", while the target location 404 serves as the "primary storage location" under normal operation and/or following a disaster recovery situation.

Furthermore, although FIG. 4 only depicts a single source location connected to a single target location, the distributed data storage system 400 may include additional storage locations coupled to the locations depicted in the present embodiment. Thus, the target location 404 includes storage tiers 408, 410 (e.g., memory) having a larger combined storage capacity than that of the storage tiers 408, 410 included in the source location 402. As operations are performed at the source location 402, they are incrementally re-performed at the target location 404 over time using network 406 and various ones of the processes included herein. Accordingly, the controllers 412 may implement various processes of snapshot-based data retention procedures, e.g., as described below with respect to method 500.

Figure 5A:
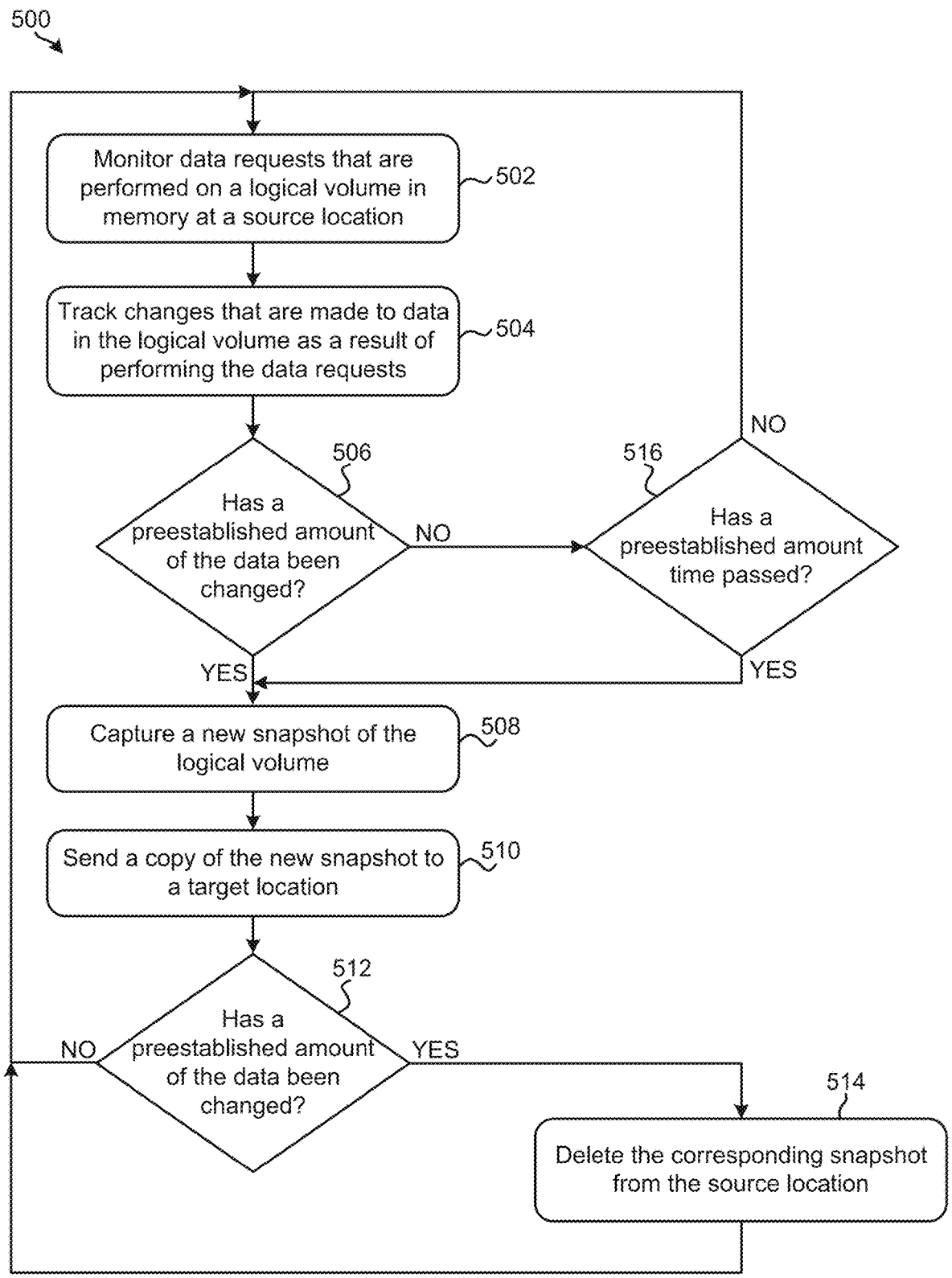
FIG. 5A is a flowchart of a method in accordance with one embodiment.

Referring now to FIG. 5A, a flowchart of a method 500 for merging snapshots is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller (e.g., see 410 in FIG. 4), a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes monitoring data requests that are performed on a logical volume in memory at a source location. Various data requests may be received from running applications, users, other storage systems, system administrators, etc. Moreover, the type of data request that is received may also vary. For instance, depending on the approach, write requests, read requests, deletion requests, merge requests, etc. may be received for implementation at a source location.

As these data requests are received, they may be placed in a queue before actually being implemented. The data requests may also be evaluated in an effort to deduplicate repeat and/or counteracting operations. By monitoring the data requests that are performed on the logical volume, operation 502 is preferably able to identify specific data (e.g., files) that is updated as a result. For instance, while a read operation may access data stored in memory, it does not actually modify the data that is stored. However, write operations, delete operations, merge operations, etc., actually modify the data stored in memory as a result of being performed. It follows that by monitoring data requests that are performed on the logical volume, method 500 is able to identify changes as they are made to the data in the logical volume.

Accordingly, operation 504 includes tracking changes that are made to data in the logical volume as a result of performing the data requests. The changes to the data may be tracked by storing the corresponding data requests in some approaches, while in other approaches information (e.g., metadata) corresponding to the data that is modified by be collected and stored. In still other approaches, operation 504 may be performed by incrementing a counter for each byte of data in the logical volume that is changed.

According to an illustrative approach, which is in no way intended to limit the invention, the changes made to the data in the logical volume may be tracked using a bitmap. For instance, referring momentarily to FIG. 5B, exemplary sub-processes of tracking changes that are made to the data in the logical volume as a result of performing the data requests are illustrated in accordance with one embodiment. It follows that one or more of these sub-processes may be used to perform operation 504 of FIG. 5A. However, it should be noted that the sub-processes of FIG. 5B are illustrated in accordance with one embodiment which is in no way intended to limit the invention.

As shown, sub-operation 530 includes creating a bitmap that is configured to track the changes to data in the logical volume that occur as a result of performing the data requests. In other words, sub-operation 530 includes creating a delta map that is able to map the changes that occur to the data during operation, e.g., as data requests are received and processed. Any desired type of bitmap or functionally equivalent element capable of tracking changes that occur to the data may be formed. The bitmap may also be formed in memory using any processes which would be apparent to one skilled in the art after reading the present description. Moreover, sub-operation 532 includes using the bitmap to indicate which portions of data (e.g., files, portions of files, extents, etc.) have been updated as a result of performing the data requests.

Figure 5B:
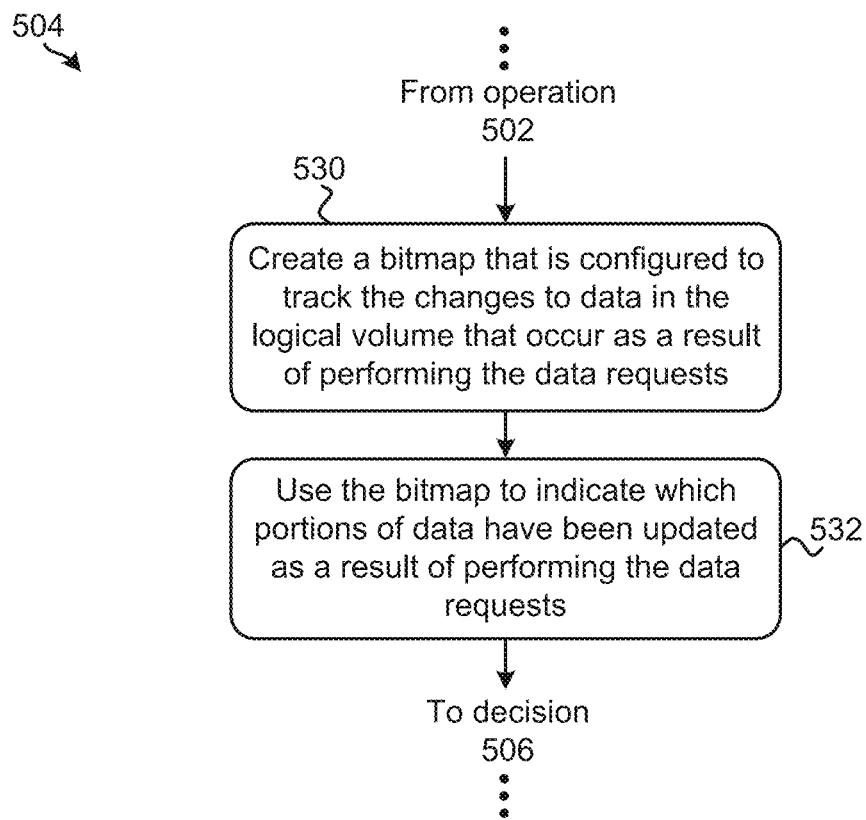
FIG. 5B is a flowchart of sub-processes for one of the operations in the method of FIG. 5A, in accordance with one embodiment.

The sub-operations included in FIG. 5B may be performed in the background, e.g., such that they do not disrupt normal operation of the overarching storage system. This allows for the bitmap to have an updated and accurate understanding of what data has been modified since a last snapshot has been captured, without negatively affecting the efficiency at which the system is able to operate, which is particularly desirable.

Referring back now to FIG. 5A, decision 506 includes determining whether a preestablished amount of the data in the logical volume has been changed as a result of performing the data requests since a previous snapshot of the logical volume was captured. In other words, decision 506 includes determining whether a predetermined amount of the data in the logical volume has been modified. As alluded to above, this determination is preferably made with respect to a last snapshot that was taken. The amount of data identified as having been modified as a result of implementing the data requests is preferably reset with each snapshot that is captured. This allows for method 500 to control how often a snapshot is taken based on the amount of data has been updated since a last snapshot was taken.

Using an amount of data that has been updated to determine whether another snapshot should be taken helps ensure that redundant snapshots are avoided. In other words, by identifying when data in the logical volume has actually been updated, method 500 is able to detect situations that warrant capturing a snapshot of the data in its current state. As noted above, this desirably reduces the consumption of computing resources, decreases network traffic, reduces data request response times, etc., thereby improving performance of the system as a whole.

In some approaches the preestablished amount of the data in the logical volume is expressed as a percentage of the total amount of data in the logical volume. For example, decision 506 may include determining whether at least 10% of the data in the logical volume has been updated as a result of performing data requests as they are received. In other approaches, the preestablished amount of the data in the logical volume is expressed as a unit of data. For example, decision 506 may include determining whether at least 1 MB of the data in the logical volume has been updated as a result of performing data requests as they are received. In still other approaches, decision 506 may include determining whether an amount of data in the logical volume has increased and/or decreased by a predetermined amount, a predetermined number of data requests have been satisfied, etc.

In response to determining that a preestablished amount of the data in the logical volume has been changed as a result of performing the data requests since a previous snapshot of the logical volume was captured, method 500 proceeds to operation 508. There, operation 508 includes capturing (e.g., creating) a new snapshot of the logical volume. Capturing the snapshot may be achieved using any processes that would be apparent to one skilled in the art after reading the present description. For instance, in some approaches the snapshot may be captured in response to issuing a system command. Moreover, in some approaches the snapshot may include the current status of all data in the logical volume, while in other approaches only the data that has been updated as a result of the data requests being performed may be included in the snapshot, e.g., in an attempt to reduce the overall size of the snapshot. This can be done at a certain granularity, or an "extent" that represents a unit of space of the volume.

From operation 508, method 500 proceeds to operation 510 which includes sending a copy of the new snapshot to a target location. As noted above, distributed data storage systems may be used to store primary and secondary (e.g., backup) copies of data. The snapshots taken at the source location containing the primary copy of the data may thereby be used to update the secondary copy of the data at the target location without disrupting performance. Sending a copy of the new snapshot to the target location thereby desirably enables the system to maintain matching copies of the data. The source location may also retain a copy of the snapshot, e.g., for backup purposes. For instance, if the copy of the snapshot sent in operation 510 is corrupted upon delivery, lost along the way, accidentally deleted by the target location, etc., the copy of this snapshot that remains at the source location may be used to send another copy. However, in other approaches the source location may not retain copies of any snapshots as additional snapshots may be captured to replace previous ones that have been lost and/or damaged.

In some approaches, method 500 also includes determining whether a predetermined amount of data included in the previous snapshot of the logical volume has been used at the target location. See optional decision 512. In other words, optional decision 512 includes determining whether a predetermined amount of the data included in a snapshot sent to the target system has actually been used to update a redundant copy of the data at the source location. In response to determining that a predetermined amount of the data included in a snapshot sent to the target system has not yet been used to update the redundant copy of the data at the source location, method 500 returns to operation 502.

However, in response to determining that a predetermined amount of the data included in a snapshot sent to the target system has been used to update the redundant copy of the data at the source location, method 500 proceeds to operation 514 which includes deleting the corresponding snapshot from the source location. As noted above, in some approaches the source location may retain a copy of the snapshots that are sent to the target location, e.g., such that the snapshot can be recovered. It follows that once a predetermined amount of a past snapshot has been implemented at the target location, it is preferred that any copies of that snapshot retained at the source location are deleted to free up storage space. Copies of the snapshot may also be deleted from the target location for similar reasons once it is no longer being used to update the data at the target location.

It should be noted that this determination of whether a given snapshot should be deleted from the source and/or target locations may be based on one or more other factors. For instance, in some approaches a snapshot may be retained at a given location for a predetermined amount of time before it is deleted. Thus, in some approaches decision 512 may be based at least in part on an amount of time that has passed since a given snapshot was sent to the target location.

From operation 514, method 500 returns to operations 502 and 504. It follows that data requests that are performed on the logical volume may continue to be monitored, and changes that are made to data in the logical volume may continue to be tracked before returning to decision 506. As mentioned above, method 500 may be performed in the background such that nominal operation of the storage system is not affected. It follows that the various processes included in method 500 may be repeated any desired number of times over any desired span.

Returning now to decision 506, in situations where it is determined that a preestablished amount of the data in the logical volume has not been changed as a result of performing the data requests since a previous snapshot of the logical volume was captured, method 500 advances to decision 516. There, decision 516 includes determining whether a preestablished amount of time has passed since the previous snapshot of the logical volume was captured. In other words, although a predetermined amount of the data in the logical volume has not yet been updated, additional conditions may trigger the capture of a snapshot. Thus, in response to determining that a preestablished amount of time has passed since the previous snapshot of the logical volume was captured, method 500 proceeds from decision 516 to operation 508 whereby a new snapshot of the logical volume is captured.

However, in response to determining that a preestablished amount of time has passed since the previous snapshot of the logical volume was captured, method 500 returns to operations 502 and 504. It follows that data requests that are performed on the logical volume may continue to be monitored, and changes that are made to data in the logical volume may continue to be tracked before returning to decision 506. Moreover, it should be noted that various ones of the processes included in method 5A may be repeated any desired number of times, e.g., as long as data requests continue being received.

It follows that the various processes included in FIGS. 5A-5B are able to use the amount of data (e.g., number of extents) that has been modified in a source volume in order to determine whether a new snapshot should be captured. Again, this this amount of data may be represented as a percentage of the total data in the logical volume, but additional capacity point objectives (or recovery point objectives) that incorporate capacity and/or time based backup policies for a given system or group of volumes may also be implemented. For example, a 10 TB capacity point objective may be implemented as a supplement to the determination made in decision 506. In other words, even if decision 506 involves deciding whether a predetermined percentage of the data in the logical volume has been updated, if 10 TB of the data in the logical volume has been updated, a new snapshot is created. This capacity point objective effectively serves as a limit to the amount of data that may be lost in a disaster situation, e.g., as would be appreciated by one skilled in the art after reading the present description.

In other words, a capacity point objectives setting allows for the frequency at which snapshots are taken to be adjusted outside the context of (e.g., supplementing) the preestablished amount of the data in the logical volume that has been changed as a result of performing the data requests since a previous snapshot of the logical volume was captured.

According to an in-use example, which is in no way intended to limit the invention, a user may create a system policy on external and/or internal software platform(s) for capacity point objective. This process may involve defining a delta objective for capacity >0 (e.g., data value difference), using any know processes. Moreover, the delta objective is preferably prioritized such that space savings is achieved in the backup copy at a target location. It is also preferred that the delta objective is more than zero to avoid duplicate snapshots being captured.

The external and/or internal software platform may thereby initiate the snapshot process by creating a delta target volume and initiating a procedure to begin saving modifications that are made to data in a source volume. Depending on the approach, the type of procedure that is initiated to begin saving modifications made to data in the source volume may be a copy-on-write procedure, a redirect-on-write procedure, or any other type of implementation which would be apparent to one skilled in the art after reading the present description. A delta map (e.g., a bitmap) is also preferably formed in order to track the modifications that are made to the data.

The external and/or internal software is preferably monitoring the status of the system in order to assess if the predetermined capacity delta has been reached. If the predetermined threshold is reached, a snapshot is initiated and captured. After being sent to the target volume, the data indicated in the snapshot is used to update data in the target volume, thereby creating a full clone of the data in the source volume. It should also be noted that this update is preferably performed in the background. However, in situations where the predetermined threshold has not been reached, e.g., because there are either no differences or not enough differences for the policy to initiate a copy, a new snapshot is not initiated.

As noted above, a number of the factors used herein may be predetermined or preestablished. Depending on the approach, various ones of these factors may be predetermined or preestablished by a user, system parameters, industry standards, past experience, etc. It follows that in some approaches, a user may be able to select the situations in which a snapshot is captured.

Figure 6:
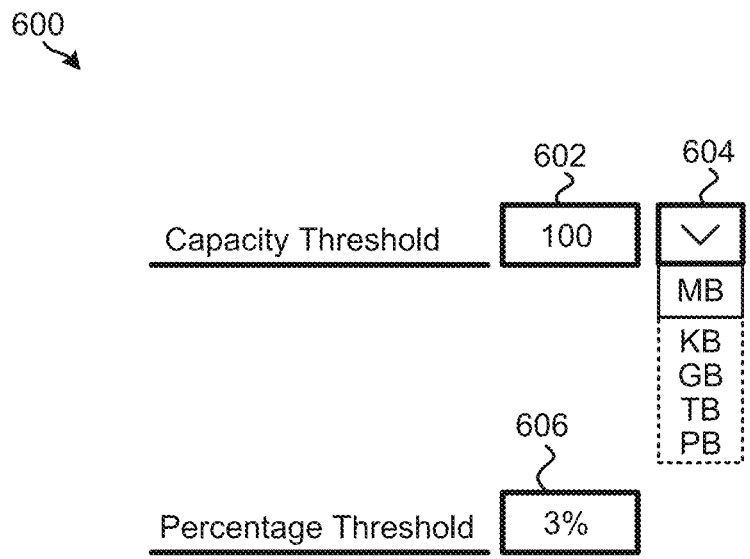
FIG. 6 is a partial representational view of a graphical user interface (GUI), in accordance with one embodiment.

For instance, looking specifically to FIG. 6, a GUI 600 which may be presented to a user is illustrated in accordance with one embodiment. As an option, the present GUI 600 may be implemented in conjunction with features from any other embodiment listed herein, such as those described with reference to the other FIGS., such as FIGS. 5A-5B. However, such GUI 600 and others presented herein may be used in various applications and/or in permutations which may or may not be specifically described in the illustrative embodiments listed herein. Further, the GUI 600 presented herein may be used in any desired environment. Thus FIG. 6 (and the other FIGS.) may be deemed to include any possible permutation.

The GUI 600 may be used by a user to create a capacity point objective policy which defines certain parameters that can be used to determine whether to capture a new snapshot of a logical volume. For instance, the capacity threshold amount may be specified in box 602, while the units corresponding to the amount may be selected in box 604. As noted above, the capacity threshold amount acts as a failsafe, effectively representing the maximum amount of data that can be modified in the logical volume at the source location before a new snapshot is captured.

The percentage threshold may also be specified in box 606. Moreover, while the threshold is depicted in the present embodiment as being a percentage of the data in the logical volume at the source location, this may be represented in any desired way, e.g., as a unit of data.

It follows that various ones of the embodiments included herein are able to achieve a more modular snapshot protection program than has been previously achievable. Users can choose to limit the amount of data change permitted before a new snapshot is created, thereby improving the efficiency at which the system is able to operation, especially in situations where the storage system is effectively offline or contains data that is not regularly written. As noted above, using an amount of data that has been updated to determine whether another snapshot should be taken helps ensure that redundant snapshots are avoided. In other words, by identifying when data in the logical volume has actually been updated, various ones of the approaches herein are able to detect situations that warrant capturing a snapshot of the data in its current state. Again, this desirably reduces the consumption of computing resources, decreases network traffic, reduces data request response times, etc., thereby improving performance of the system as a whole.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   monitoring data requests that are performed on a logical volume in memory at a source location;
   tracking changes that are made to data in the logical volume as a result of performing the data requests;
   determining whether a preestablished amount of the data in the logical volume has been changed as a result of performing the data requests since a previous snapshot of the logical volume was captured;
   in response to determining that a preestablished amount of the data in the logical volume has been changed as a result of performing the data requests since the previous snapshot of the logical volume was captured, capturing a new snapshot of the logical volume;
   sending a copy of the new snapshot to a target location; and
   in response to determining that a predetermined amount of data included in the previous snapshot of the logical volume has been used at the target location, deleting the previous snapshot.

2. The computer-implemented method of claim 1, wherein tracking changes that are made to the data in the logical volume as a result of performing the data requests includes:
   creating a bitmap that is configured to track the changes to data in the logical volume that occur as a result of performing the data requests; and
   using the bitmap to indicate which portions of data have been updated as a result of performing the data requests.

3. The computer-implemented method of claim 1, wherein the preestablished amount of the data in the logical volume is a percentage of a total amount of the data in the logical volume.

4. The computer-implemented method of claim 1, comprising:
   in response to determining that a preestablished amount of time has passed since the previous snapshot of the logical volume was sent to the target location, deleting the previous snapshot.

5. The computer-implemented method of claim 1, comprising:
   determining whether a preestablished amount of time has passed since the previous snapshot of the logical volume was captured; and in response to determining that a preestablished amount of time has passed since the previous snapshot of the logical volume was captured, capturing the new snapshot of the logical volume.

6. The computer-implemented method of claim 1, wherein the operations are performed by a controller coupled to the source location, wherein the controller is configured to communicate with a target location, wherein the source and target locations are geographically separated from each other.

7. The computer-implemented method of claim 6, wherein the controller is configured to communicate with the target location using a wide area network.

8. A computer program product comprising one or more computer readable storage media having program instructions embodied therewith, the program instructions readable and/or executable by a processor to cause the processor to:
monitor, by the processor, data requests that are performed on a logical volume in memory at a source location;
track, by the processor, changes that are made to data in the logical volume as a result of performing the data requests;
determine, by the processor, whether a preestablished amount of the data in the logical volume has been changed as a result of performing the data requests since a previous snapshot of the logical volume was captured;
in response to determining that a preestablished amount of the data in the logical volume has been changed as a result of performing the data requests since the previous snapshot of the logical volume was captured, capture, by the processor, a new snapshot of the logical volume;
send, by the processor, a copy of the new snapshot to a target location;
in response to determining that a predetermined amount of data included in the new snapshot of the logical volume has been used to update data at the target location, delete, by the processor, the new snapshot; and
in response to determining that a second predetermined amount of data included in the copy of the new snapshot of the logical volume has been used to update data at the target location, cause, by the processor, the copy of the new snapshot to be deleted from the target location.

9. The computer program product of claim 8, wherein tracking changes that are made to the data in the logical volume as a result of performing the data requests includes:
creating a bitmap that is configured to track the changes to data in the logical volume that occur as a result of performing the data requests; and
using the bitmap to indicate which portions of data have been updated as a result of performing the data requests.

10. The computer program product of claim 8, wherein the preestablished amount of the data in the logical volume is a percentage of a total amount of the data in the logical volume.

11. The computer program product of claim 10, wherein the program instructions are readable and/or executable by the processor to cause the processor to:
determine, by the processor, whether an amount of the data in the logical volume that has been changed as a result of performing the data requests since a previous snapshot of the logical volume was captured is greater than a capacity point objective; and
in response to determining that the amount of the data in the logical volume that has been changed as a result of performing the data requests since the previous snapshot of the logical volume was captured is greater than the capacity point objective, capture, by the processor, a new snapshot of the logical volume irrespective of the preestablished amount of the data in the logical volume.

12. The computer program product of claim 11, wherein the program instructions are readable and/or executable by the processor to cause the processor to:
in response to determining that a preestablished amount of time has passed since the previous snapshot of the logical volume was sent to the target location, delete, by the processor, the previous snapshot.

13. The computer program product of claim 8, wherein the program instructions are readable and/or executable by the processor to cause the processor to:
determine, by the processor, whether a preestablished amount of time has passed since the previous snapshot of the logical volume was captured; and
in response to determining that a preestablished amount of time has passed since the previous snapshot of the logical volume was captured, capture, by the processor, the new snapshot of the logical volume.

14. The computer program product of claim 8, wherein the operations are performed by a controller coupled to the source location, wherein the controller is configured to communicate with a target location, wherein the source and target locations are geographically separated from each other.

15. The computer program product of claim 14, wherein the controller is configured to communicate with the target location using a wide area network.

16. A system, comprising:
a processor; and
logic integrated with the processor, executable by the processor, or integrated with and executable by the processor, the logic being configured to:
monitor, by the processor, data requests that are performed on a logical volume in memory at a source location;
track, by the processor, changes that are made to data in the logical volume as a result of performing the data requests;
determine, by the processor, whether a preestablished amount of the data in the logical volume has been changed as a result of performing the data requests since a previous snapshot of the logical volume was captured;
in response to determining that a preestablished amount of the data in the logical volume has been changed as a result of performing the data requests since the previous snapshot of the logical volume was captured, capture, by the processor, a new snapshot of the logical volume;
send, by the processor, a copy of the new snapshot to a target location;
in response to determining that a predetermined amount of data included in the new snapshot of the logical volume has been used to update data at the target location, delete, by the processor, the new snapshot; and
in response to determining that a second predetermined amount of data included in the copy of the new snapshot of the logical volume has been used to update the data at the target location, cause, by the processor, the copy of the new snapshot to be deleted from the target location.

17. The system of claim 16, wherein tracking changes that are made to the data in the logical volume as a result of performing the data requests includes:
   creating a bitmap that is configured to track the changes to data in the logical volume that occur as a result of performing the data requests; and
   using the bitmap to indicate which portions of data have been updated as a result of performing the data requests.

18. The system of claim 16, wherein the logic is configured to:
   determine, by the processor, whether an amount of the data in the logical volume that has been changed as a result of performing the data requests since a previous snapshot of the logical volume was captured is greater than a capacity point objective; and
   in response to determining that the amount of the data in the logical volume that has been changed as a result of performing the data requests since the previous snapshot of the logical volume was captured is not greater than the capacity point objective, determine, by the processor, whether the preestablished amount of the data in the logical volume has been changed as a result of performing the data requests since the previous snapshot of the logical volume was captured.

19. The system of claim 16, wherein the logic is configured to:
   determine, by the processor, whether a preestablished amount of time has passed since the previous snapshot of the logical volume was captured; and
   in response to determining that a preestablished amount of time has passed since the previous snapshot of the logical volume was captured, capture, by the processor, the new snapshot of the logical volume.

* * * * *